(12) United States Patent
Bunker et al.

(10) Patent No.: US 6,279,222 B1
(45) Date of Patent: Aug. 28, 2001

(54) MANUFACTURE OF BRAKE PADS

(75) Inventors: Kenneth James Bunker, Rearsby; John David Holme, Rugby; Alan Jeffory Phillips, Buxton, all of (GB); Hans Fischer, Leverkusen; Peter Gareth Denton, Bad Camberg, both of (DE)

(73) Assignee: Federal-Mogul Technology Limited, Rugby (GB)

(*) Notice: Subject to any disclaimer, the term of this patent is extended or adjusted under 35 U.S.C. 154(b) by 0 days.

(21) Appl. No.: 09/011,179

(22) PCT Filed: Jul. 22, 1996

(86) PCT No.: PCT/GB96/01756

§ 371 Date: Jul. 6, 1999

§ 102(e) Date: Jul. 6, 1999

(87) PCT Pub. No.: WO97/06370

PCT Pub. Date: Feb. 20, 1997

(30) Foreign Application Priority Data

Aug. 3, 1995 (GB) .................................................. 9515926

(51) Int. Cl.[7] .......................... B22D 11/128; B22D 19/02; F16D 69/04; B22C 9/02
(52) U.S. Cl. ............................ 29/527.5; 164/11; 164/44; 164/245; 188/250 B; 188/250 G
(58) Field of Search ....................... 29/527.5; 188/250 B, 188/250 G; 164/111, 44, 245

(56) References Cited

U.S. PATENT DOCUMENTS

| | | | |
|---|---|---|---|
| 684,559 | * | 10/1901 | Vair ........................................ 164/111 |
| 787,092 | * | 4/1905 | Gallagher . |
| 1,559,146 | * | 10/1925 | Andrews . |
| 1,950,260 | * | 3/1934 | Nelson . |
| 3,624,758 | * | 11/1971 | Harris ...................................... 164/44 |
| 3,738,418 | * | 6/1973 | Harris ...................................... 154/44 |
| 3,986,585 | | 10/1976 | Toplis et al. ......................... 188/73.1 |
| 4,023,613 | * | 5/1977 | Uebayashi et al. ................... 164/111 |
| 4,569,424 | | 2/1986 | Taylor, Jr. .......................... 188/250 G |
| 4,599,772 | * | 7/1986 | Graham ................................ 164/111 |
| 4,799,579 | | 1/1989 | Myers et al. ...................... 192/107 M |
| 5,141,083 | | 8/1992 | Burgoon .............................. 188/73.1 |
| 5,429,216 | * | 7/1995 | Kahr . |
| 5,732,800 | * | 3/1998 | Spigener .......................... 188/250 G |

FOREIGN PATENT DOCUMENTS

| | | | |
|---|---|---|---|
| 758303 | * | 7/1953 | (DE) ..................................... 164/111 |
| 871077 | * | 4/1942 | (FR) ..................................... 164/111 |
| 1160503 | | 8/1969 | (GB) .............................. F16D/69/04 |
| 58-212837 | * | 12/1983 | (JP) ........................................ 164/44 |

* cited by examiner

Primary Examiner—I Cuda Rosenbaum
Assistant Examiner—Eric Compton
(74) Attorney, Agent, or Firm—Synnestvedt & Lechner LLP

(57) ABSTRACT

A method of manufacturing a brake pad comprising casting a back plate in a mould. The plate is formed with at least one integral projection which overhangs an adjacent surface of the plate. The mould is formed from frangible material and has a recess in the shape of the projection. The mould is formed from particulate material compressed around a projection made of resilient material which deforms to the shape of the projection. The resilient material is withdrawn to form the recess. Metal is cast in the mould including the recess. After solidification of the metal, the mould is broken away from the projection. The method also comprises pressing a mixture containing friction material and curable material against the plate including pressing the mixture around the projection so that it extends beneath the overhang and curing the curable material to form a block of friction material adhered to the plate.

10 Claims, 2 Drawing Sheets

MANUFACTURE OF BRAKE PADS

This invention is concerned with a method of manufacturing a brake pad, for example a brake pad suitable for use in a disc brake of a vehicle.

A conventional brake pad comprises a pad of friction material adhered to a back plate. The pad contains a mixture of various friction-enhancing and wear-promoting materials and is bonded together by a cured material which is often phenolic resin. Such a pad is conventionally formed by pressing a mixture containing friction material and curable material against the back plate so that a block of curable material is formed adhered to the back plate, and curing said curable material. The block of friction material may subsequently be machined to its final shape.

In order to adhere the block to the back plate, adhesive is commonly used and the back plate, which is usually made of rolled steel, may define a small number of cylindrical holes or depressions which are entered by friction material. The friction material in these holes or depressions acts to resist the removal of the friction material from the back plate by forces caused by contact with the disc. It is also known (see GB 2 245 667 A) to provide the back plate with projections which enter the friction material and serve the same purpose as the above-mentioned holes or depressions. However, these holes or depressions or projections do not materially assist in preventing the friction material from becoming detached from the back plate as a result of failure of the adhesive. Such a failure of the adhesive, which may occur because of high temperatures created by brake operation, can result in complete loss of the block of friction material.

Various attempts have been made to key the block of friction material to the back plate to prevent loss of the block in the event of adhesive failure or, indeed, to avoid the necessity for the use of adhesive. For example, it is known (EP 0 084 591 A) to apply metal powder to the back plate and sinter the powder to form a porous layer into the interstices of which the friction material can enter. Another known possibility (EP 0 387 182 B) is to weld a piece of expanded metal mesh to the back plate so that the mesh becomes embedded in the friction material. These possibilities, although they improve the keying, are complex to manufacture.

DE 26 29 793 A describes a back plate which is made from cast iron instead of rolled steel. One advantage claimed for the use of this material is that the friction material adheres well to the rough cast surface. However, this publication does not suggest that the keying can be improved by casting any features into the back plate. GB 1 160 503 describes a back plate which may be made of cast metal and which has anchoring recesses to receive the friction material. It is mentioned that these recesses may be undercut but no method for achieving this is disclosed.

It is an object of the present invention to provide a method of manufacturing a brake pad which provides a brake pad with improved keying.

The invention provides a method of manufacturing a brake pad, the method comprising forming a back plate by a casting operation in a mould, the back plate being formed with at least one integral projection which overhangs and adjacent surface portion of the back plate, the mould being formed from frangible material and having a recess therein in the shape of the projection, the mould being formed by compressing particulate material against a surface from which there is a projection made of resilient material, the compression causing the resilient material to deform to the shape of the required projection of the back plate, solidifying said particulate material, and withdrawing said resilient material to form the recess, the method also comprising casting metal in the mould including said recess, the metal in said recess forming said projection, and, after solidification of the metal, breaking the mould away from the projection, the method also comprising pressing a mixture containing friction material and curable material against the back plate including pressing said mixture around said projection so that it extends beneath said overhang, and curing said curable material to form a block of friction material adhered to the back plate.

In a method according to the invention, the overhang of the projection provides the required keying in a simple manner. In most cases, the keying is additional to the use of adhesive of conventional type for bonding the block to the back plate.

Preferably, the back plate is formed with a plurality of the projections distributed over at least part of the surface of the back plate which is engaged by the block. For example, there may be projections in the form of ribs with overturned portions running transversely, or longitudinally, or both transversely and longitudinally forming a lattice. Alternatively, said projection or projections may be generally cylindrical with an overturned top lip. Numerous other shapes are possible.

Preferably, the or each projection is formed within a recess in the back plate.

The invention also provides a brake pad manufactured by a method in accordance with the invention.

There now follows a detailed description, to be read with reference to the accompanying drawings, of a method of manufacturing a brake pad which is illustrative of the invention.

IN THE DRAWINGS

Figure 1:
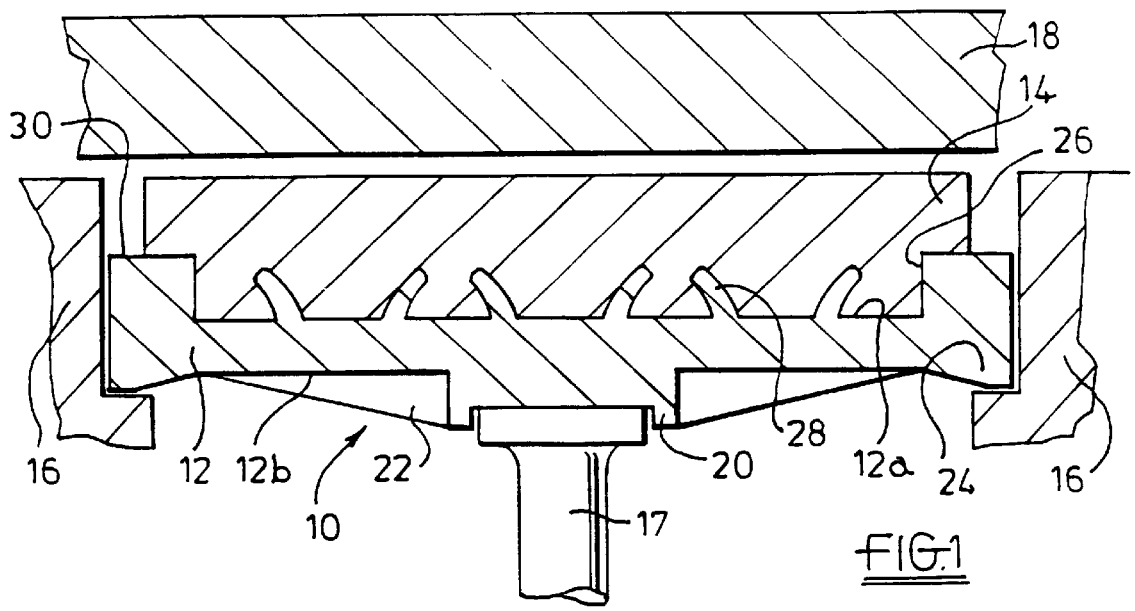
FIG. 1 is a cross-sectional view taken through an illustrative brake pad manufactured by the illustrative method.

The brake pad 10 shown in FIG. 1 is for use in a disc brake of a commercial vehicle. The pad 10 comprises a back plate 12 and a block 14 of friction material which is adhered to an upper surface 12a of the back plate 12. In service, the brake pad 10 is mounted in a calliper 16 so that a lower surface 12b of the back plate 12 is engaged by a piston rod 17 which is movable to urge the block 14 against a disc 18.

Figure 2:
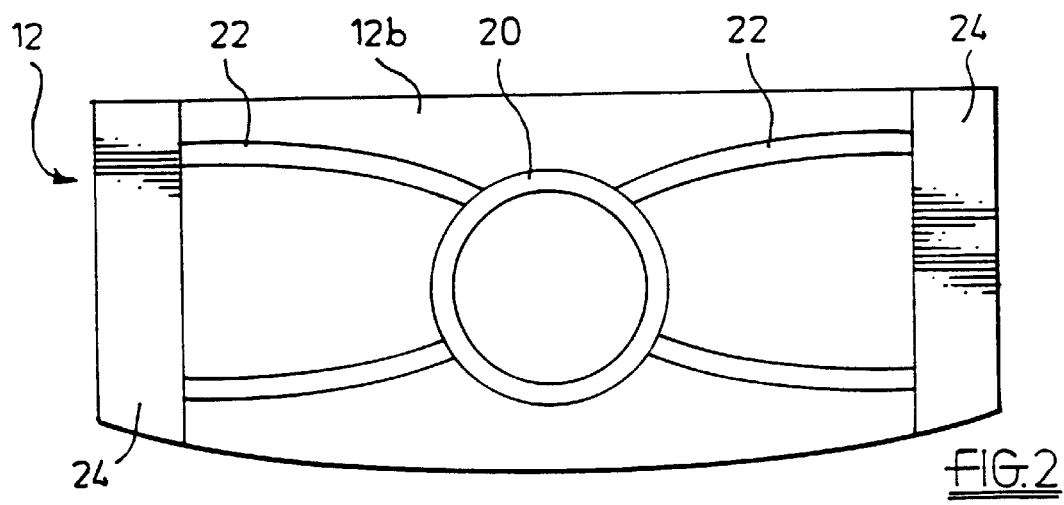
FIG. 2 is a plan view of a lower side of the back plate of the illustrative brake pad.

The back plate 12 is made of cast metal which is, in this case, iron but other metals such as aluminium may be used. The back plate 12 has features cast into its upper surface 12a and into its lower surface 12b. The features cast into the lower surface 12b can be seen in FIG. 2 and comprise a cylindrical boss 20 which receives the piston rod 17, load-spreading ribs 22 which are connected to the boss 20 and extend towards the corners of the back plate 12, and peripheral downwards projections 24 which improve the guidance of the back plate 12 in the callipers 16 (especially when the block 14 becomes worn).

Figure 3:
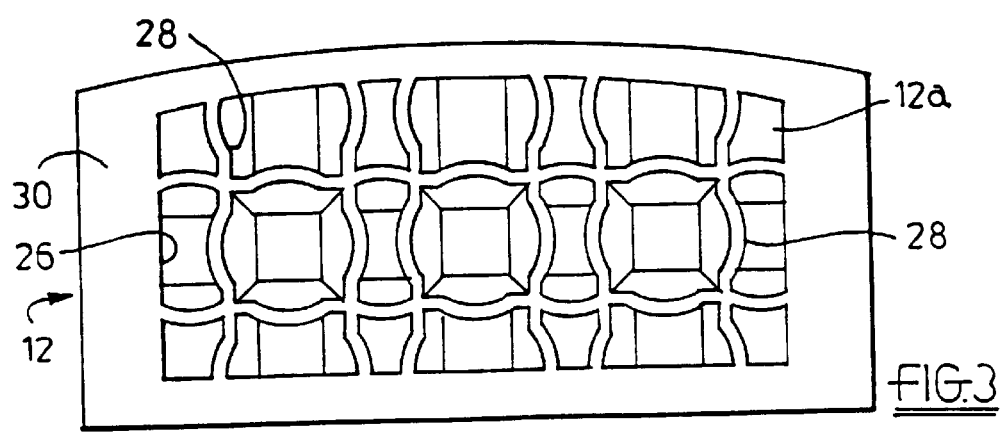
FIG. 3 is a plan view of an upper side of the back plate of the illustrative back plate.

The features cast into the upper surface 12a of the back plate 12 can be seen in FIG. 3. These features comprise a central recess 26 and projections 28 which project upwardly within the recess 26 but without exceeding the height of a lip 30 of the surface 12a which extends around the recess 26. As can be seen from FIG. 1, the block 14 of friction material fills the recess 26 and extends partially across the lip 30. The projections 28 are integral with the remainder of the back plate 12, being formed by casting as described below. The projections 28 overhang adjacent surface portions of the back plate 12, those surface portions forming part of the floor of the recess 26. The projections 28 are enveloped in the block 14 of friction material.

The projections 28 have a complex form which is best understood from the description below of how the projections are produced. Briefly, however, there are six projections 28 extending transversely of the back plate 12 and two projections 28 extending longitudinally thereof. Each projection 28 is in the form of a rib with overturned portions and extends across the recess 26 from junctions with the lip 30. The eight projections, thus, form a lattice with the six transverse ribs crossing the two longitudinal ribs.

Adjacent to their junctions with the lip 30 and adjacent to their crossing points, the projections 28 stand substantially upright and do not overhang. However, between these points, the projections 28 bow sideways and overhang. Specifically, the two longitudinal projections 28 bow away from one another and the six transverse projections bow in alternating directions as can be seen in FIG. 1. Since the block 14 of friction material envelopes the projections 28 within the recess 26, the lip 30 and the projections 28 act to resist removal of the block 14 from the back plate 12 in directions parallel to the upper surface of the block 14 and the overhangs of the projections act to resist removal of the block 14 form the back plate 12 in a direction normal to said upper surface.

The illustrative method of manufacturing the brake pad 10 comprises forming the back plate 12. This process is illustrated by FIGS. 4 and 5 which show how a mould portion 32 for casting the upper surface 12a of the back plate 12 including the projections 28 is made.

The projections 28 are formed, in the illustrative method, by forming the mould portion 32 from frangible material, specifically sand. The mould portion 32 is formed with recesses therein in the shapes of the projections 28 and metal is cast into the recesses. After solidification of the metal, the mould portion 32 is broken away from the projections 28. This process is illustrated by FIGS. 4 and 5.

Figure 4:
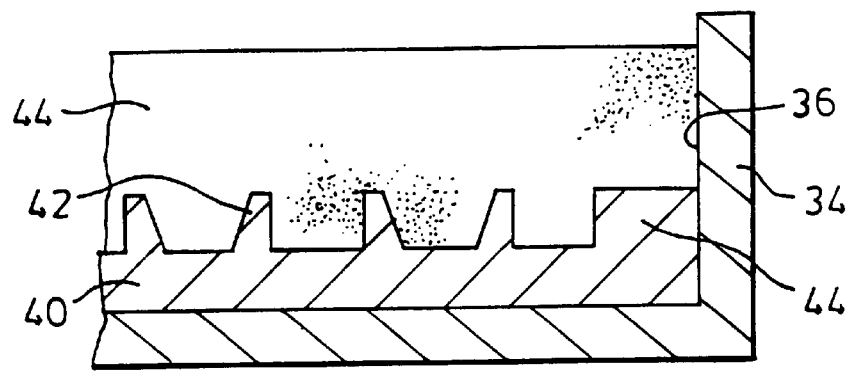
FIGS. 4 and 5 are cross-sectional views illustrating stages in the formation of a back plate used in the illustrative method.
Figure 5:
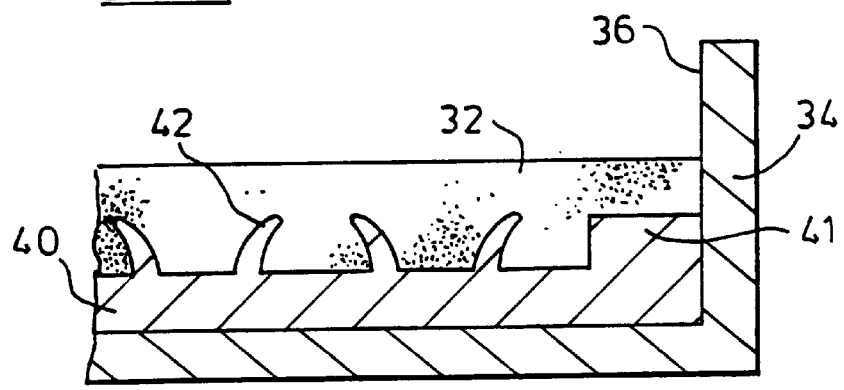

FIG. 4 shows an open-topped box 34 which defines a cavity 36 which, in plan view, has the outline shape of the back plate 12. Resting on the bottom of the box 34 within the cavity 36 is a sheet 40 made of resilient material, specifically rubber. The sheet 40 covers the bottom of the box 36 and has an upwards projection 41 running around the edge of the box 36. The projection 41 is in the shape of the lip 30 of the back plate 12. Within the area surrounded by the projection 41, the sheet 40 has further projections 42 projecting upwardly therefrom. The projections 42 are in the form of ribs which extend transversely or longitudinally of the cavity 36 from points at which they join the projection 41. There are six transverse projections 42 and two longitudinal projections 42 which cross one another and form a lattice. Each projection 42 has a generally rectangular base at its junction with the remainder of the sheet 40, a substantially vertical side wall, a horizontal and generally rectangular top which is narrower than the base and is flush with the top of the projection 41, and a planar inclined side wall.

In the illustrative method, casting sand 44 containing a conventional binder is introduced into the cavity 36 so that it covers the sheet 40, enveloping the projections 42 and covering the projection 41. Next, a tool (not shown) is pressed into the cavity 36 to compress the sand 44 against the sheet 40. The sand 44 is held in its compressed state until it solidifies, with the help of the binder, thereby forming the mould portion 32. The compression of the sand 44 causes the projections 42 to be deformed to the shape of the projections 28 of the back plate 12. Specifically, the compression does not deform the projections 42 significantly adjacent to the junctions between the projections 41 and 42 nor adjacent to crossing points of the transverse and longitudinal projections 42. However, away from these junctions and crossing points, the projections 42 are deformed with their tops bending over towards their vertical side walls which become concave and their planar inclined side walls stretch becoming convex. In this way, the projections 42 take on the shape of the of the projections 28.

Once the sand 44 has solidified to form said mould portion 32, the compressing pressure is released allowing the sheet 40 to be removed. During this removal, the projections 42 deform back to their original shape leaving recesses in the mould portion 32 which are in the deformed shape of the projections 42. The mould portion 32 is then assembled with a mould portion (not shown) having the shape of the surface 12b of the back plate 12. Molten iron is cast in the mould so formed by conventional means so that the metal enters the recesses formed by the projections 41 and 42. Once the iron has solidified, the cast back plate 12 is removed from the mould by breaking the mould portion 32 away from the projections 28.

The illustrative method also comprises pressing a mixture containing friction material and curable material against the back plate 12 so that a block of curable material is adhered to the back plate, and curing said curable material to form the block 14 of friction material adhered to the back plate 12. This part of the method is conventional and involves introducing said curable material, which comprises uncured phenolic resin, into a die cavity on top of a movable punch. The die cavity has the outline shape, in plan view, of the block 14. Next, the back plate 12, to which adhesive has been applied, is clamped over the opening of the die cavity so that the projections 28 project towards the interior of the cavity. Next, the punch is moved towards the back plate 12 compressing the mixture into the shape of the block 14. Said mixture is pressed around the projections 28 and extends beneath their overhangs. The plate 12 with the uncured block 41 adhered thereto is then removed from the die cavity and the phenolic resin is cured by a heat treatment.

Figure 6:
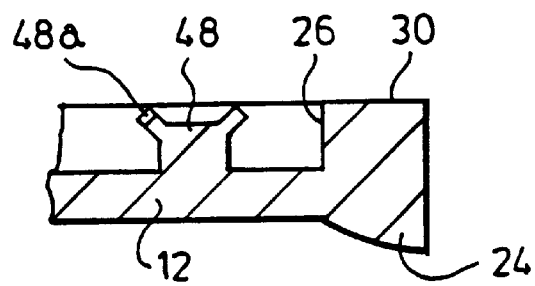
FIG. 6 is a cross-sectional view of an alternative form of projection of a back plate used in a modification of the illustrative method.
Figure 7:
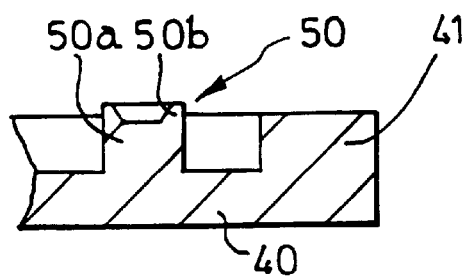
FIG. 7 is a cross-section view of a projection used in casting the projection shown in FIG. 6.

FIGS. 6 and 7 illustrate a modification of the illustrative method in which the projections 28 are replaced by projections 48 of the form shown in FIG. 6. The projections 48 are generally cylindrical with an overturned top lip 48a. The projections 48 are distributed in a regular array across the bottom surface of the recess 26 of the back plate 12. The lips 48a overhang portions of said bottom surface of the recess 26 and are flush with the lip 30.

FIG. 7 illustrates a resilient projection 50 which is used to form a recess in which one of the projections 48 can be cast. The projections 50 project upwardly from the sheet 40 in place of the projections 42. The projection 50 has a cylindrical stem 50a which is integral with the remainder of the sheet 40 and a rib 50b which projects upwardly from the top of the stem 50a and extends around the periphery of said top. The rib 50b is similar in cross-sectional shape to the projections 42 having a vertical outer cylindrical surface, a flat top, and an inclined inner surface.

The mould portion for casting the projections 48 is made in the same way as the mould portion 32 for casting the projections 42. When the sand 44 is compressed, the rib 50b deforms into the shape of the overturned lip 48a.

What is claimed is:

1. A method of manufacturing a brake pad, the method comprising forming a back plate by a casting operation in a mould, the back plate being formed with at least one integral projection which overhangs an adjacent surface portion of the back plate, the mould being formed from frangible material and having a recess therein in the shape of the projection, the mould being formed by compressing particulate material against a surface from which there is a projection made of resilient material, the compression causing the resilient material to deform to the shape of the required projection of the back plate, solidifying said particulate material, and withdrawing said resilient material to form the recess, wherein the casting operation comprises casting metal in the mould including said recess, the metal in said recess forming said projection, and, after solidification of the metal, breaking the mould away from the projection, the method also comprising pressing a mixture containing friction material and curable material against the back plate including pressing said mixture around said projection so that it extends beneath said overhang, and curing said curable material to form a block of friction material adhered to the back plate.

2. A method according to claim 1, wherein the back plate is formed with a plurality of such projections distributed over at least part of the surface of the back plate which is engaged by the block.

3. A method according to claim 2, wherein said projections are in the form of ribs with overturned portions.

4. A method according to claim 2, wherein each said projection is generally cylindrical with an overturned top lip.

5. A method according to claim 1, wherein the or each projection is formed within a recess in the back plate.

6. A method according to claim 2, wherein the at least one projection is formed within a recess in the back plate.

7. A method according to claim 1, wherein the projection made of resilient material has no overhang in an undeformed state of the projection.

8. A method according to claim 7, wherein said projection is in the form of an elongated rib.

9. A method according to claim 8, wherein the rib has opposite side walls which are inclined at different angles.

10. A method according to claim 7, wherein said projection is in the form of a cylinder having an open recess in the top thereof.

* * * * *